(12) United States Patent
Henry

(10) Patent No.: US 7,000,227 B1
(45) Date of Patent: Feb. 14, 2006

(54) ITERATIVE OPTIMIZING COMPILER

(75) Inventor: Gregory Henry, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 398 days.

(21) Appl. No.: 09/675,975

(22) Filed: Sep. 29, 2000

(51) Int. Cl.
*G06F 9/45* (2006.01)

(52) U.S. Cl. ............... 717/152; 717/146; 717/151; 717/155; 717/158

(58) Field of Classification Search ........... 717/151, 717/146, 155, 158, 152
See application file for complete search history.

(56) References Cited

U.S. PATENT DOCUMENTS

| | | | | |
|---|---|---|---|---|
| 5,175,856 A | * | 12/1992 | Van Dyke et al. | 717/151 |
| 5,396,631 A | * | 3/1995 | Hayashi et al. | 717/159 |
| 5,428,780 A | * | 6/1995 | England et al. | 717/142 |
| 5,442,790 A | | 8/1995 | Nosenchuck | |
| 5,535,391 A | * | 7/1996 | Hejlsberg et al. | 717/140 |
| 5,606,697 A | * | 2/1997 | Ono | 717/154 |
| 5,634,059 A | * | 5/1997 | Zaiki | 717/160 |
| 5,815,720 A | * | 9/1998 | Buzbee | 717/158 |
| 5,966,537 A | * | 10/1999 | Ravichandran | 717/158 |
| 5,966,538 A | * | 10/1999 | Granston et al. | 717/158 |
| 6,059,840 A | * | 5/2000 | Click, Jr. | 717/154 |
| 6,247,174 B1 | * | 6/2001 | Santhanam et al. | 717/154 |
| 6,412,107 B1 | * | 6/2002 | Cyran et al. | 717/151 |

* cited by examiner

*Primary Examiner*—Tuan Dam
*Assistant Examiner*—Qamrun Nahar
(74) *Attorney, Agent, or Firm*—Blakely, Sokoloff, Taylor & Zafman LLP

(57) ABSTRACT

An optimizing compiler and method thereof performs a sequence of optimizing changes to an intermediate language representation of a routine, and measures an execution characteristic of each optimization, such as a timing of the machine language representation performed on an architecture similar to the target machine using a user selectable initialization state. The sequence of optimizations is selected according to a criterion that includes a lexicographic search and other methods. The pre-optimized code is also broken into segments wherein discrete optimizations are performed on each segment and measured using a user provided routine. The target routine is tested with the object code in main memory if not the cache if possible and optimizations are chosen only if they improve the target subroutine according to the user defined metric. After a stopping criterion is achieved, the most optimized code is selected.

24 Claims, 5 Drawing Sheets

```
subroutine foo (A,B,C,M,N)
double precision A(*), B(*), C(*), SUM1
integer M, N, I, J
call samp_auxiliary_routine(M,N)
sum1=0,d0
do I = 1,M
  sum1 = sum1 + A(I)
    do J = 1, N
        sum1 = sum1 + A((I-1)*M+J) + B((I-1)*M+J)
    enddo
    C(I) = sum1
enddo
return
end
```

FIG. 1

```
samp_auxiliary_routine(A,B)
int *A, *B;
{ *A = ARRAY_SIZE;
  *B = ARRAY_SIZE;
}
```

FIG. 2

```
supercompiler_timer()
{
extern void (*supercompiler_routine)()

/*Example usage actually calls the target subroutine
twice, so time that:*/

(*supercompiler_routine)(A, B, C, &N, &M);
(*supercompiler_routine)(A, B, C, &N, &M);
}
```

FIG. 3

```
#define ARRAY_SIZE 1024
int N=0
intM=0
double A[ARRAY_SIZE*ARRAY_SIZE];
double B[ARRAY_SIZE*ARRAY_SIZE];
double C[ARRAY_SIZE];

supercompiler_initialized()
{
int i;

/* Initialize the variables: */
for (i = 0; i<ARRAY_SIZE*ARRAY_SIZE ; i++)
{
 A[i] = (double) i;
 B[i] = (double) i;
}
for (i = 0; i<ARRAY_SIZE; i++ ) C[i] = (double) i;

/*The target subroutine needs to call an auxiliary
routine: */ supercompiler_binding("samp_auxiliary_routine_",&samp
_auxiliary_routine_);

/*Place the caches into a known state: clean */
flush_cache();
}
```

FIG. 4

ITERATIVE OPTIMIZING COMPILER

BACKGROUND OF THE INVENTION

1. Field of the Invention

The present invention relates to a computer implemented compiling tool, and more particularly a computer implemented method and apparatus for optimizing compiler generated object code.

2. Background Information

Most computer programmers write computer programs in source code using high-level languages such as C, FORTRAN, or PASCAL. While programmers may easily understand such languages, modern computers are not able to directly read and execute such languages. Thus, such computer programs must be translated into a language, known as machine language, that a specific computer can read and execute. One step in the translating process is performed by a compiler. A compiler can be thought of as a collection of interfacing algorithms, that together typically and generally translate a high-level source code program into an object code program (where it is understood that the term as used in this specification refers to any mechanism that transforms the representation of a program into another representation). The object code for execution by a computer is machine language.

A compiler generally has a front end that transforms the source code into a low level, yet largely machine independent language, called the intermediate code; and a back end that converts the intermediate code into the machine specific object code. Object code produced by conventional compilers may often be made to improve their performance in some characteristic, such as by executing faster, by minimizing bus utilization, or by requiring less memory. This improvement is called optimization. Compilers that apply code-improving transformations are called optimizing compilers.

A conventional optimizing compiler takes as input the intermediate code output by a compiler front end, and applies some static heurism to the intermediate code to hopefully produce an object code version that is more efficient than the object code would be without the transformations, without changing the meaning of the source program. These static optimization techniques include common subexpression elimination, instruction re-ordering, dummy instruction insertion, instruction substitution, loop unrolling, and loop fusion.

The problem is that prior art optimizing compilers apply only static, generic, and generally global change(s) to the code because they do not optimize for specific code variable values, and because they do not evaluate the affect of individual code changes on the performance of the object code.

BRIEF DESCRIPTION OF THE DRAWINGS

The present invention will be described by way of exemplary embodiments, but not limitations, illustrated in the accompanying drawings. Identical numerals indicate the same elements throughout the figures.

FIG. 1 is one embodiment of a source language routine, here portrayed as a C language routine. The portrayed source language routine is an exemplar of a routine file whose object file representation can be optimized by the present invention. FIG. 1 is also an example of when the target subroutine happens to call another auxiliary subroutine, not optimized by the present invention. The measuring routine portrayed in FIG. 3, and the initialization routine portrayed in FIG. 4 are each written to support the exemplary optimizing of the source language routine's object file representation.

FIG. 2 is one embodiment of a source language routine portrayed as a C language routine and called by the routine portrayed in FIG. 1.

FIG. 3 is one embodiment of an exemplary measuring routine of the present invention that commands the measurement of a characteristic of an execution of the measuring routine, and of a compiled version of a source code routine that is a component of the measuring routine. The measuring routine is here portrayed as a C language routine that commands an execution of a machine language representation of the source routine portrayed in FIG. 1 and measures execution time. The optimizing compiler of the present invention is referred to therein as the supercompiler.

FIG. 4 is one embodiment of an exemplary initialization routine of the present invention that provides an initial value to the source code routine before its machine language representation execution. The optimizing compiler of the present invention is referred to therein as the supercompiler.

DETAILED DESCRIPTION

Figure 5:
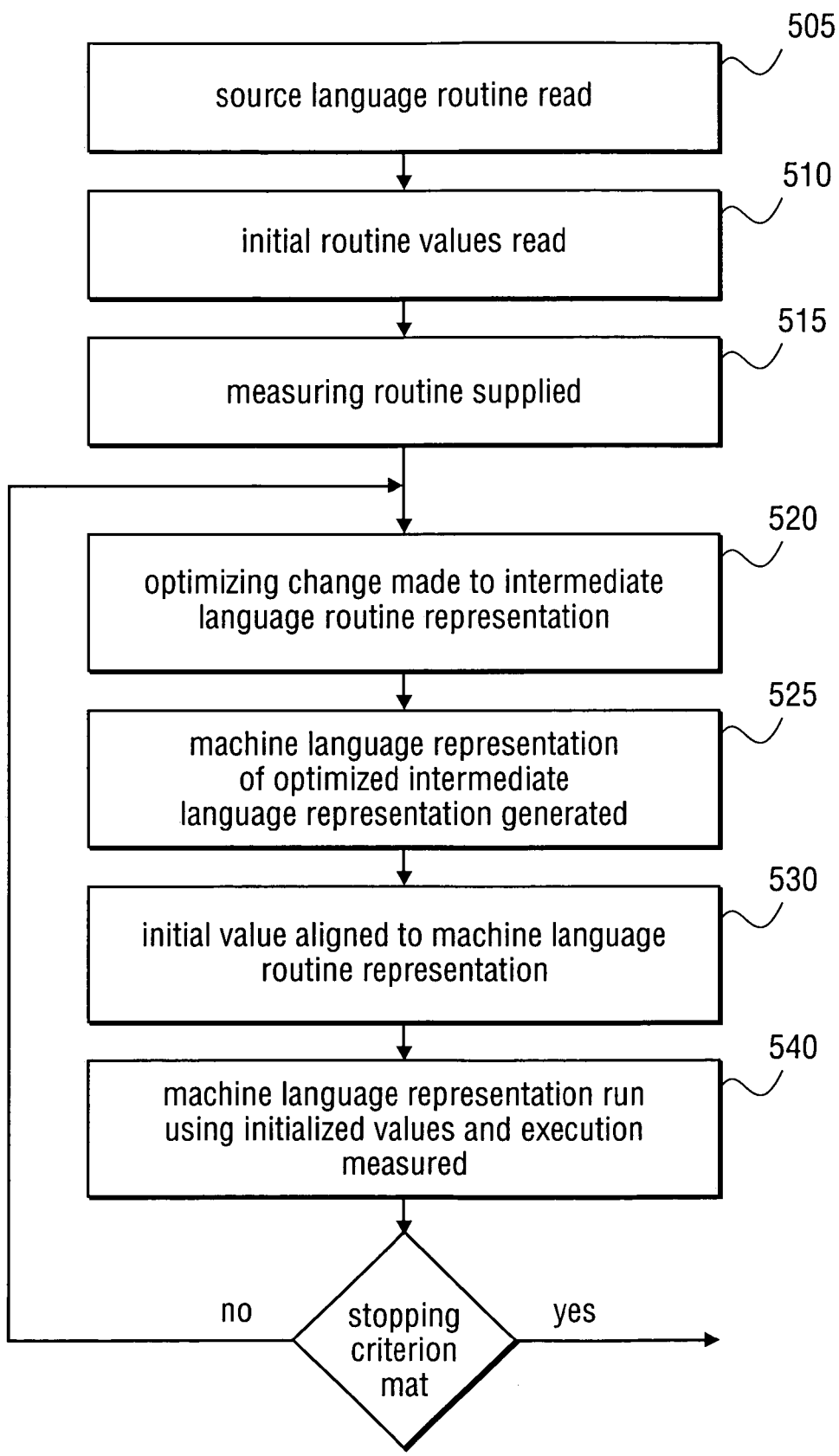
FIG. 5 is one embodiment of a flow chart of a process of the present invention.

In the following description, various aspects and details of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific aspects and details. In other instances, well known features are omitted or simplified in order not to obscure the present invention.

Some portions of the descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a circuit that can include a programmed computer system, or similar electronic computing device. A computer system manipulates and transforms data represented as physical (electronic) quantities within the computer system's registers and memories into other data similarly represented as physical quantities within the computer system memories or registers or other such information storage, transmission or display devices.

The present invention also relates to apparatus including circuits for performing the operations herein. This apparatus may be specially constructed for the required purposes, or it may include a general purpose computer selectively activated or reconfigured by a computer program stored in the computer. Such a computer program may be stored in a computer readable storage medium. A machine readable storage medium includes any mechanism that provides (i.e. stores and/or transmits) information in a form readable by a machine (e.g. a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc. The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Various operations will be described as multiple discrete steps performed in turn in a manner that is most helpful in understanding the present invention, however, the order of description should not be construed as to imply that these operations are necessarily order dependent on the order the steps are presented. Furthermore, the phrase "in one embodiment" and "an embodiment" will be used repeatedly, however the phrase does not necessarily refer to the same embodiment, although it may.

Referring to FIG. 1, an exemplary print-out of a source language routine written in the C programming language is shown. The exemplary routine portrayed in FIG. 1 is a subroutine named "foo" that has five arguments, "A", "B", "C", "M", and "N", and itself calls a subroutine named samp_auxiliary_routine that has two arguments, "A" and "B", portrayed in FIG. 2 as a C programming language routine. The iterative optimizer of the present invention operates on the compiled code of the target subroutine in FIG. 1 by executing changes to its intermediate language representation to produce an optimized object routine. Thus, any high level language that can be compiled into an object language representation is a candidate for optimization by the method and apparatus of the present invention. The present invention in broad terms iteratively implements an optimizing change to an intermediate language representation, transforms the changed intermediate language representation into a machine language representation, selectively initializes the machine language routine, executes the machine language routine in a computing system having the architecture of the target machine, measures a user selected execution characteristic such as execution time or memory usage, and determines if a stopping criterion has been met.

If the stopping criterion has not been met, the method and apparatus repeat the aforesaid process, saving the version of the most optimized routine according to the selected criterion. A preferred target routine for optimization using the method and apparatus of the present invention is a routine that may used repeatedly and in which it is desirable to have a highly optimized object code version. The resulting output of the iterative optimizer of the present invention is the fastest code the system is able to find for the target machine. The key elements of this technique are using reverse communication as a performance metric, placing instructions in main memory, and testing them iteratively, using some novel searching methods highlighted later.

Referring now to FIG. 3, a preferred embodiment exemplary timing routine, named in the portrayed embodiment "supercompiler_timer", is input in the computing system of the present invention to preferably indicate that the iterative optimizer is to measure the execution time of the timing routine. The measuring routine is preferably implemented as a C source language routine. The exemplary timing routine includes a C language mechanism to access "foo" by utilization of the C language keywords "extern void" and an argument preceded by an "*", well known to those skilled in the C programming language, as a pointer to a function defined externally to the given routine, where "void" indicates that the routine itself does not return an argument value.

The timing routine itself includes at least a call to the routine being optimized so that a machine language representation of that routine is executed when the timing routine is executed and timed. Thus, in order to time the exemplary subroutine named "foo", a user includes a call to "foo" within the timing routine. An alternative embodiment of the present invention can include a straightforward execution and measurement of each machine language representation. Yet another alternative embodiment of the present invention would require the timing routine to explicitly return a metric of performance (like the timing). In this embodiment, the timing routine preferably implemented does not explicitly itself implement a timing, but instead commands in a convenient grammar the computing system of the present invention to execute and time any code included within the timing routine. The timing itself, or any other requested figure of merit, occurs by conventional program statements and systems calls within the iterative optimizer embedded code. The timing routine here implemented provides a flexibility to time more than just a routine to be optimized, but any additional code or combinations of the routine. In the example portrayed, "foo" using as arguments "A", B", "C", "&N", "&M", and also using the arguments "A" and "B" reversed, are timed together.

This mechanism provides a convenient and flexible way for a user to request a measurement of any of a plural number of execution figures of merit, such as bus usage or memory utilization, by inputting to the iterative optimizer computing system a pertinent calling routine for the figure of merit, and the specification of what code is to be measured, where, by way of example, the routine "supercompiler_timer" for measuring an execution time is used. The preferred characteristic to optimize is the execution time of the machine language representation.

Referring to FIG. 4, an exemplary initialization routine "supercompiler_initialize( )" preferably written as a C language source program routine initializes the non-globally defined variables of the object language representation by directly assigning values to the source language variables.

The globally defined variables, here "N" and "M", and the data types "N", "M", "A", "B", and "C" are each defined outside supercompiler_initialize. Each variable is preferably specifically initialized. Variables not specifically initialized are assigned a default value by the iterative optimizer software of the present invention. The exemplary initialization routine includes a "supercompiler_binding" statement for binding addresses as a preferred mechanism to pass the address of any auxilary subroutines that the target subroutine being converted to machine code requires to the iterative optimizer of the present invention. The first argument in supercompiler_binding, "'samp_auxiliary_routine_'", is the name of the routine required by the routine being optimized, and the second argument, "&samp_auxiliary_routine ", is the address in memory of the additional routine. If the target subroutine "foo" does not require calling any other subroutines, then the "supercompiler_binding" is not necessary. In the preferred embodiment, the iterative optimizer will assign an instruction address for any auxilary subroutines that "foo" requires at link time. Neither the supercompiler_initialize as implemented, nor the supercompiler_timer portrayed with reference to FIG. 2, take any parameters, and therefore all the variables are global. This is an implementation decision. The exemplary supercompiler_initialize initializes "A" and "B", stores the data, and binds the object code representation by passing to the iterative optimizer of the present invention the memory addresses required for "foo". Furthermore, the initializing routine exemplary flushes cache with the "flush_cache_routine" written in the syntax of a C language program, placing the cache into a known state, so that each execution of a version of "foo" includes a common baseline cache. The "flush_cache( )" routine is an example of an initialization of memory to both create a common baseline for executing iterative versions of an object language representation of the routine being optimized, and also to initialize system/cache memory to a specific state for generating a routine version optimized for a specific cache/memory state. In other embodiments of the invention, a user can directly initialize preferred memory states.

A user of the present invention inputs into a computing system the source language routine to be optimized discussed with reference to FIG. 1, the measuring routine discussed with reference to FIG. 3, and the initialization routine discussed with reference to FIG. 4. The preferred method and apparatus of the present invention is a library resident in computer memory that links with the intermediate language representation of the routine being optimized, the initialization routine, and the measuring routine. It implements a sequence of optimization changes to the intermediate language routine as shall be discussed with reference to FIG. 5 according to algorithms, and executes the values. In the preferred embodiment of the present invention, the iterative optimizer software is a library and the initializing and timing routines are linked with the routine to be optimized and together they are all launched as an application.

A user attempting to optimize the target subroutine in FIG. 1 would first write some high level code to measure the performance of the target subroutine (and this is what FIG. 3 does) and some code to initialize the variables required by the target subroutine (and this is what FIG. 4 does). Compilers in previous art do not have access to this crucial bits of information (a method of explicitly measuring the performance of a routine). This invention requires information and code similar to FIGS. 3 and 4 be provided so that this invention can do more effective optimization than previously possible.

Referring now to FIG. 5, the present invention includes both a method or process of compiling a source language routine, an apparatus that includes structures that perform the functions herein described, and program instructions in a machine readable medium which when executed by at least one processor cause the processor to perform the specified operations. In block 505, a source language routine that needs optimization is read into a computing system. The computing system has stored therein an executable form of the iterative optimizer software of the present invention. The iterative optimizer software is preferably written in the C higher-level computer language. The computing system also has stored therein a compiler having a front end that generates an intermediate code translation of an input source language routine, and a back end that generates an executable code translation of the intermediate code. The preferred embodiment of the present invention includes a conventional compiler linked to the iterative optimizer of the present invention. However, it is understood that the present invention includes an embodiment having a compiler and an iterative optimizing code structured in a higher level language representation as a unitary routine.

In block 510, a user supplied specification of initial data values of the source language routine variables is preferably read into the computing system in the form of computer software language statements. Each specified variable value is assigned to the corresponding variable before routine execution. The user may also specify initial memory assignments for the routine variables, as well as initialize the cache and memory state. The initialization routine is presented in greater detail with reference to FIG. 3. How the present invention preferably executes the machine language representation to determine the optimized code shall be disclosed presently. A most optimized representation of the object code is dependent upon the initial value of its variables. A specific example of this dependency is a variable value representing a number of loop iterations. A low number value may indicate that the most optimized machine language translation of the code should include an unrolling of the loop, while a high number value would undoubtedly indicate that the loop should not be unrolled. If a variable is not specifically initialized with a value, the iterative optimizer software of the present invention supplies a default value to the variable before execution. In the preferred embodiment, the user supplied specification comprises a C language routine, wherein the values are preferably linked to the variables by the iterative optimizer software of the present invention.

In block 515, a user supplied measuring routine for specifying a measurable characteristic of an execution of a compiled version of the source language routine is provided to the iterative optimizer software of the present invention. The characteristic can be any measurable figure of merit of the optimized executable code such as bus utilization, memory utilization, and execution time, and is preferably the execution time of the optimized machine language representation of the source language routine. The measuring routine can specify the measurement of an execution of any combination of object language representations and specifiable discrete program steps, as presented with reference to FIG. 3. In the preferred embodiment of the present invention, the measuring routine is a C language routine that is compiled and executed under the control of the code optimizing software to time the execution time of each optimized version of the machine language representation of the source language routine.

In blocks 520–535, an optimization is applied to the intermediate language code, the intermediate language code is converted to machine language, the initial values of the routine variables are assigned to the variables, the machine language code is executed, the effectiveness of the executed code is measured, and a determination is made whether a stopping criterion has been met. If the stopping criterion has not been met, blocks 520–535 are iterated again, wherein a new optimization is generated, the resulting code is executed in real time, and the effectiveness of the executed code is measured. Thus, a plurality of optimizations are applied, and the best one selected for the particular variable values of interest. The stopping criterion may include a specified performance gain, a specified elapsed time in finding an optimal object code version, an inability to derive an optimization attempt (which is an unlikely determination), and a relative improvement in terms of the measured effectiveness of the executed code. A new optimization is preferably selected according to at least one of a lexicographical search in which an optimization is tried each time selected from all the permutations of possible optimizations, an interactive search in which a user provides to the code optimization software, preferably through an interactive menu, the specific optimizations to try, permitting a user to interactively customize the optimization procedure, and a genetic search according to a non-linear optimization of the search domain. Furthermore, an non-optimized version of the machine language code is optionally executed and its effectiveness measured to be used as a standard in the evaluation of the optimum object routine representation.

Referring again to block 520, a code optimizing routine makes a code optimizing change to the intermediate code representation of the source language routine. The code optimizing routine analyzes any change to substantially determine that the change does not effect the meaning of the routine, often referred to as not breaking the code. This code optimizing alteration results in an altered intermediate language routine. A novel optimizing alteration is preferably made in each iteration, as described above with reference to blocks 520–535. The preferred embodiment of the present invention first attempts generic optimizations on its internal representation. These generic optimizations may include substitutions of a set of instructions, the insertion of new instructions, and the deletion of unnecessary instructions. The code optimizing routine of the present invention attempts a reordering search over possible permutations of the best effort to date to determine if key memory prefetches in different places, or other reorderings will speed up the code further. The code optimizing routine of the present invention attempts global reordering such as moving all load references to a particular variable up or down, where it is possible to do so without breaking the code. The code optimizing routine of the present invention attempts the insertion or deletion of extra instructions such as floating point stack exchange (fxch) to determine if they help or slow things down. If the target subroutine contains long strings of independent instructions (user settable, usually set at around 30), the code optimization routine inserts dependency barriers to break the search space down into segments, each one of which is independently optimized to limit the number of possible optimizing permutations in each segment.

The code optimizing routine incorporates user selectable optimization strategies. These can be interactively input into the computer system via selections menus. This enables a user to both interactively receive the intermediate and object code and the performance of the optimization process of this invention, and to respond to this information by dynamically specifying optimizing strategies based on this information. Preferred examples of interactive user inputs include: "display tasks 10–50", "produce an assembly output of the best result so far", "time and report timing on the best result so far", "move current task 29 up to position 10", "move all the loads of the array A up one position (where possible)", "move all the stores of array B down one position (where possible)". Another user selectable optimization strategy of the present invention includes a user pre-selecting the supercompiler to perform a specific search. Another, less interactive technique is to allow the optimizing routine to chose its own strategies, as long as they are in fact improvements as indicated by the user provided timing routine.

In block 525, the altered intermediate language code is input to the compiler back end, resulting an altered machine language version of the altered intermediate code.

In block 530, each variable initial value as described in reference to block 510 is assigned to each corresponding variable, with unassigned variables given a default value. In the preferred embodiment of the present invention, the variables are assigned their initial values by a linking procedure before execution of the machine language representation. Alternatively, the variables may be assigned their values by a parsing routine or other techniques well know to those skilled in the art.

In block 535, the altered machine language routine is executed using the initialized values explained with reference to blocks 510 and 530. The machine language representation is stored before execution in main memory, preferably L1 or L2, to reduce execution time so that as many distinct optimizations can be generated and tested in a time period. Furthermore, it is preferred that the intermediate language routine and the machine langauge routine representations remain in main memory between iterations in order to minimize database accessing time. This is significantly faster (the example in FIG. 1 is easily over a thousand times faster) than the usual alternative, which is to store machine language code on disk, in object files, then go through the time consuming process of linking the object files together and running them. This process is also used to accurately measure the execution time (or other figure of merit of the compiled code) independently of extraneous and not completely consistent affects of access and search times, and to accurately compare each machine language routine. Moreover, each execution is run on a processing unit having the same memory architecture (particularly cache architecture), and processing unit architecture as the target machine, to compare the affect of the optimizations on the actual architecture for which usage is targeted. In the preferred embodiment of the present invention, block 535 is performed in a computing system having parallel processors so that a maximum quantity of distinct optimizations can be generated and tested in a period of time. Preferably, each processor can optimize a separate segment, and thus generate optimizations for each segment independently and in parallel, permitting the generation of a maximum number of solution permutations in a given time. It is also preferred that each step of the code optimizing process of the present invention be performed in the same computing system to again maximize the number of optimizations that can be generated and tested in a period of time. The characteristic of the execution is measured, preferably a timing routine for an execution time characteristic. In block 540, if a stopping criterion has not been met, blocks 520–535 are iterated.

Figure 6:
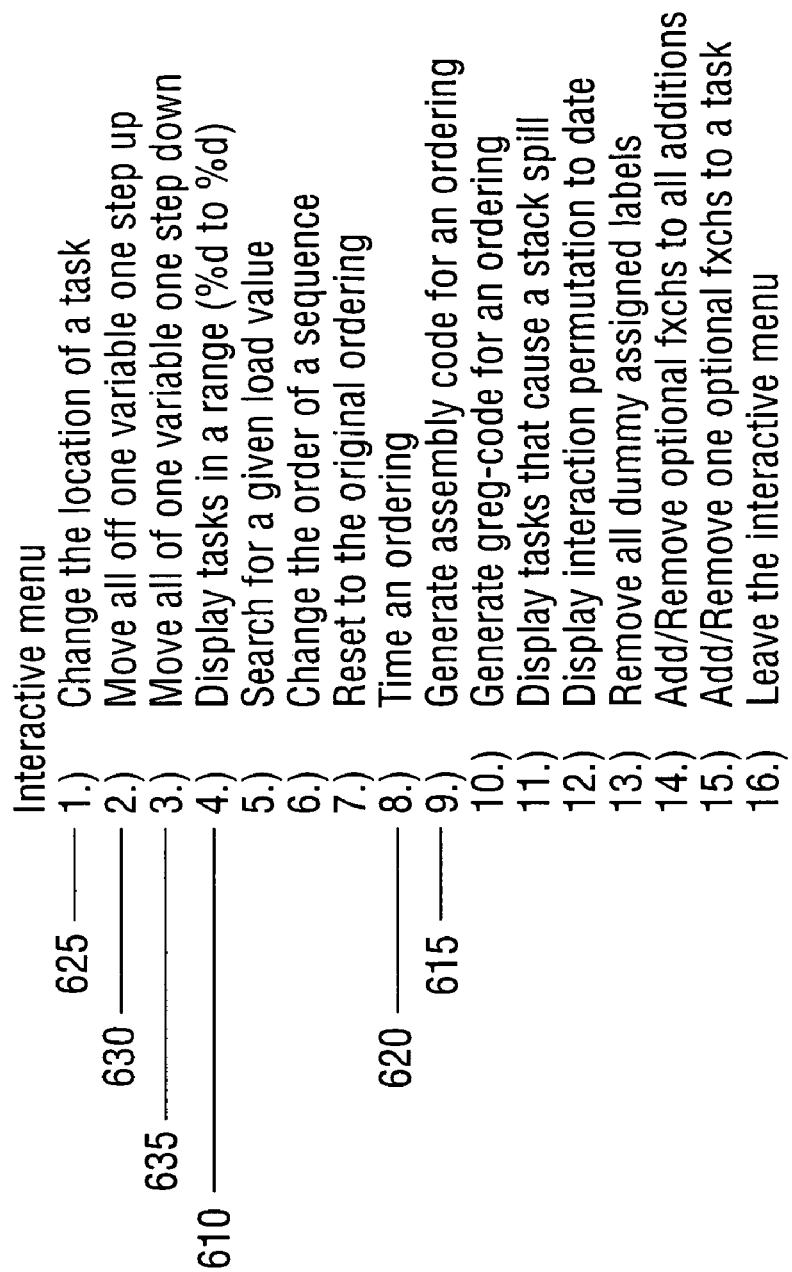
FIG. 6 is one embodiment of an interactive menu driven by the present invention, for user selection of optimization strategies of the present invention.

Referring to FIG. 6, an interactive menu includes menu selection items for a user selecting specific optimizations to try, as described with reference to FIG. 5. Preferred examples of interactive user inputs include: "display tasks in a range" 610, e.g. "display tasks 10–50", "produce an assembly output of the best result so far" 615, "time and report timing on the best result so far" 620, "change the location of a task" 625, e.g. "change the location of ask 29 up to position 10" 625, "move all the loads of the array A up one position (where possible)" 630, "move all the stores of array B down one position (where possible)" 635.

Figure 7:
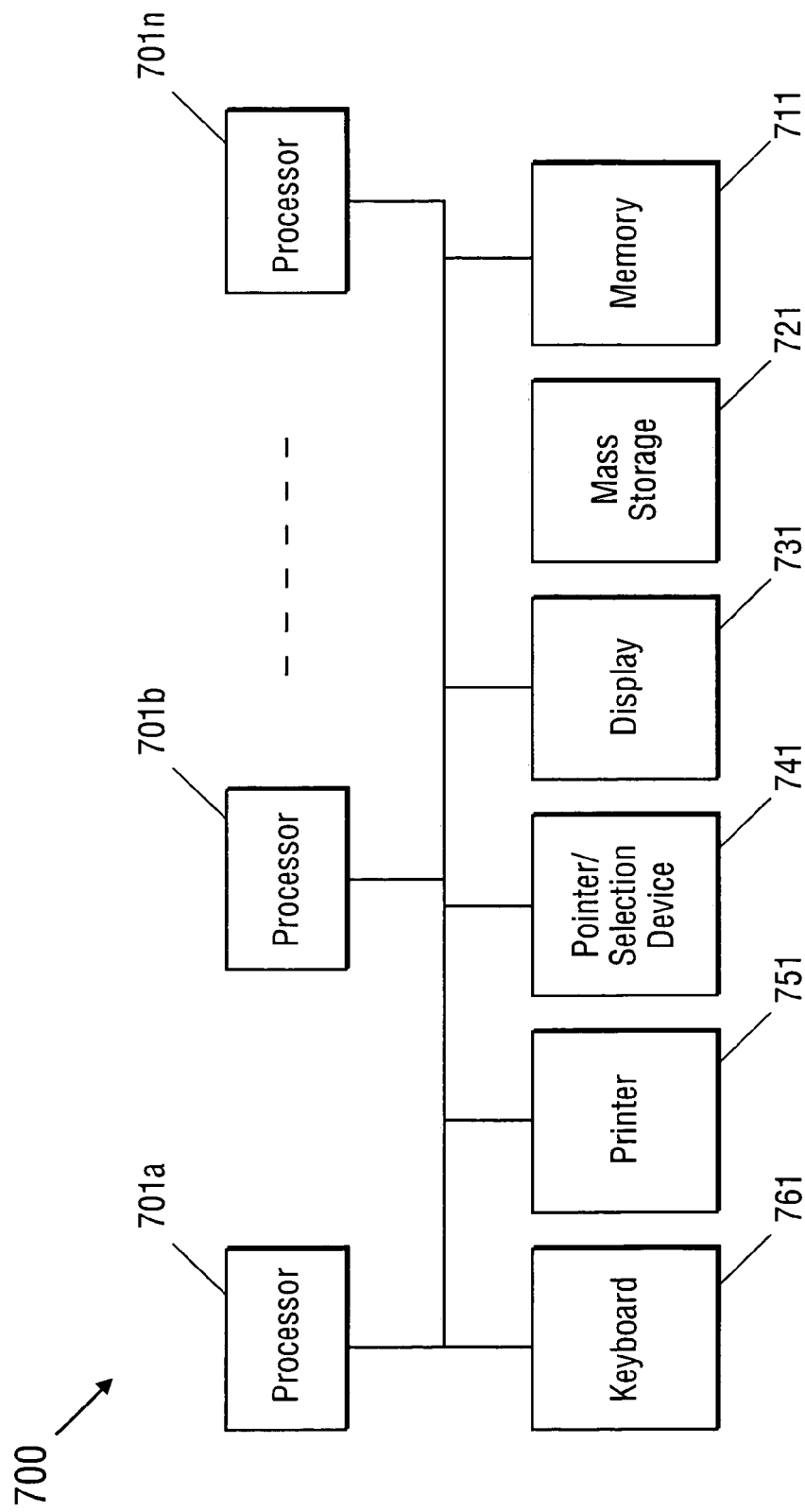
FIG. 7 is one embodiment of a computing system of the present invention.

Referring to FIG. 7, a computing system 701 is preferably identical for both compiling a source language routine representation, and executing and measuring the machine language routine representation, and it is preferred that the computing system have an identical architecture of the target machine so that machine language representation is optimized for the target machine. It is also preferred in order to test a maximum number of separate optimizations in a time period, that a system of parallel processors 701a–n be implemented, wherein a plurality of separate processor systems, each one identical to the target system architecture (which may itself be a multi-processor architecture, generates an optimized version of the code, and executes that code, under the control of a master processor 701a. Each parallel processing system will access the same random access memory 711, though each processor may have its own cache. The master processor 701a will also be coupled to a mass storage device, preferably a disk 721, and a user interface comprising at least a display 731, a pointing/selection device 741, a printer 751, and a keyboard 761.

While certain exemplary embodiments have been described and shown in the accompanying drawings, it is to be understood that these embodiments are merely illustrative of and not restrictive of the broad invention. The present invention is not limited to the specific constructions and arrangements shown and described, and alternative embodiments will become apparent to those skilled in the art to which the present invention pertains without departing from the scope of the present invention. The scope of the present invention is defined by the appended claims rather than the foregoing description.

I claim:

1. A method of compiling a source language routine, the method comprising:
   generating an intermediate language routine from the source language routine provided by a user;
   specifying an initial value of each routine variable by calling an initialization routine separated from the source language routine and provided by the user, the initialization routine being called from the intermediate language routine;
   performing an optimizing change to the intermediate language routine that results in an altered intermediate language routine, the optimizing change including a change based on a criterion specified by the user;
   generating a machine language routine from the altered intermediate language routine;
   executing the machine language routine in a computer system having architecture of a target computer system;
   measuring a characteristic of the execution by calling a measuring routine separated from the source language routine and provided by the user, the measuring routine being called from the intermediate language routine; and
   evaluating whether a stopping criterion after said executing is met based on a result of calling the measuring routine and if not,
   repeating said performing through said measuring, and saving the machine language routine having a best measured characteristic, until the stopping criterion is met, wherein said characteristic includes at least one of a lowest timing, a machine language routine size, and a bus utilization metric,
   wherein the initialization routine and the measuring routine are provided by the user as additional source code separated from the source language routine to be optimized, and wherein the initialization routine and the measuring routine are compiled, linked, and launched with the source language routine as a single application.

2. The method defined in claim 1, further including defining a plurality of segments within the intermediate language routine, each said segment comprising consecutive intermediate language routine statements wherein no segment includes a same intermediate language routine statement, and the performing an optimizing change is performed within one of the segments.

3. The method defined in claim 1 further including determining ordering dependencies in said intermediate language routine wherein said performing an optimizing change includes maintaining the determined ordering dependencies.

4. The method defined in claim 1 wherein the optimizing change comprises one of a generic optimization, a reordering, a user selectable reordering, a user selectable global reordering, a user selectable insertion of at least one instruction in a selectable position in the intermediate language routine, and a user selectable removal of at least one instruction from a selectable position in the intermediate language routine; wherein each optimizing change does not affect the intermediate language routine integrity.

5. The method defined in claim 1 further including after the generating the machine language routine and before the executing the machine language routine, at least one user selectable optimization to the machine language routine.

6. The method defined in claim 1 wherein the optimizing changes in a sequence of a plural number of a repeated said performing resulting from the stopping criterion not met is performed according to a process that includes at least one of a non-repeating optimizing change, a user selectable optimization change sequence; and a parallel search across a plural number of processing units.

7. The method defined in claim 1 wherein the initializing further includes initializing the position of at least part of said machine language routine in the first computing system memory, and the executing includes executing the machine language using the initialized position.

8. A machine-readable storage medium that stores instructions, which when executed by a processor, cause said processor to perform operations comprising:
   generating an intermediate language routine from a source language routine provided by a user;
   specifying an initial value of each routine variable by calling an initialization routine separated from the source language routine and provided by the user, the initialization routine being called from the intermediate language routine;
   performing an optimizing change to the intermediate language routine that results in an altered intermediate language routine;

generating an object language routine from the altered intermediate language routine;

executing the object language routine in a computer system having architecture of a target computer system;

measuring a characteristic of an execution of the object routine by calling a measuring routine separated from the source language routine and provided by the user, the measuring routine being called from the intermediate language routine; and evaluating whether a stopping criterion is met based on a result of calling the measuring routine and if not, repeating said performing through said evaluating, and saving the object language file having a best measured characteristic, until the stopping criterion is met, wherein the characteristic includes at least one of a lowest timing, an object code size, or a bus utilization, wherein the initialization routine and the measuring routine are provided by the user as additional source code separated from the source language routine to be optimized, and wherein the initialization routine and the measuring routine are compiled, linked, and launched with the source language routine as a single application.

9. The machine-readable storage medium in claim 8 wherein the operations further include defining a plurality of segments within the intermediate language routine, each said segment comprising consecutive intermediate code statements wherein no segment includes a same intermediate language routine code, and the performing an optimizing change is performed within one of the segments.

10. The machine-readable storage medium in claim 8 wherein the operations further include determining ordering dependencies in the intermediate language routine, wherein the performing an optimizing change includes maintaining the determined ordering dependencies.

11. The machine-readable storage medium in claim 8 wherein the optimizing change comprises one of a generic optimization, a reordering, a user selectable reordering, a user selectable global reordering, a user selectable insertion of at least one instruction in a selectable position in the intermediate language routine, and a user selectable removal of at least one instruction from a selectable position in the intermediate language routine; wherein each optimizing change does not affect the intermediate language file integrity.

12. The machine-readable storage medium in claim 8 wherein the operations further include after the generating the object language routine and before the executing, implementing at least one user selectable optimization to the object language file.

13. The machine-readable storage medium in claim 8 wherein the optimizing changes in a sequence of a plural number of a repeated said performing resulting from the stopping criterion not met is performed according to a process that includes at least one of a non-repeating optimizing change, a user selectable optimization change sequence;

and a parallel search across a plural number of processing units.

14. The machine-readable storage medium in claim 8 wherein the initializing further includes initializing the position of at least a portion of the object language routine in a main memory of a computing system that performs the execution.

15. The machine-readable storage medium in claim 8 wherein the operations further include a user interface for reading from the user at least one of the specified values of the routine variables, and optimizing instructions wherein the performing operation includes implementing the optimizing instructions.

16. An apparatus comprising:

a compiler to translate a source routine into an intermediate routine, and translate an intermediate routine into an object routine;

a file initializer to initialize each variable of an object routine to an initial value according to a user specified value retrieved by calling an initialization routine separated from the source routine and provided by a user of the source routine, the initialization routine being called from the intermediate routine;

an optimizer to implement an optimizing change in the intermediate routine;

a computing system having an architecture of a target computing system to execute the optimized object file from a main memory of the computing system in which the variables are assigned the initial values;

an execution characteristic measurer to measure a characteristic of an execution of the object routine including calling a measuring routine separated from the source routine and provided by the user, the measuring routine being called from the intermediate language routine; and an evaluator to determine if characteristics of the execution of the optimized object routine is in accordance with a stopping criterion based on a result of calling the measuring routine and if not, to repeat an execution of the optimizer, an execution of the re-optimized code, and an execution of the execution characteristic measurer, until the stopping criterion is met, wherein the characteristic includes at least one of a lowest timing, a machine language size, and a bus utilization, wherein the initialization routine and the measuring routine are provided by the user as additional source code separated from the source language routine to be optimized, and wherein the initialization routine and the measuring routine are compiled, linked, and launched with the source language routine as a single application.

17. The apparatus defined in claim 16 wherein the optimizer further includes in a sequence of repeated executions of the optimizer, and execution of the optimized object code, at least one of a non-repeating optimizing change, and a user selectable optimization change sequence.

18. The apparatus defined in claim 16 wherein the computing system executes an object file that is not optimized in the target computing system from the main memory, that includes the initialized variables and an execution of the execution characteristic measurer.

19. The apparatus defined in claim 16 further including a code segmenter to determine a plurality of segments within the intermediate routine, each segment comprising consecutive intermediate routine statements wherein no segment includes a same intermediate language statement, and the optimizer implements a change to one of the segments.

20. The apparatus defined in claim 16 wherein the optimizing change includes a determination of ordering dependencies in the intermediate file and the optimizing change maintains the determined ordering dependencies.

21. The apparatus defined in claim 16 wherein the optimizing change includes one of a generic optimization, a reordering, a user selectable reordering, a user selectable global reordering, a user selectable insertion of at least one instruction in a selectable position in the intermediate language routine, and a user selectable removal of at least one instruction from a selectable position in the intermediate language routine; and wherein each optimizing change does not affect the intermediate file integrity.

22. The apparatus defined in claim 16 wherein the change in the intermediate routine file includes a user selectable optimization.

23. The apparatus defined in claim 16 wherein the file initializer is further to initialize the position of at least a portion of the object routine file in the main memory, and the computing system is further to allocate the main memory according to the initialized positions of the portion of the object routine.

24. The apparatus defined in claim 16 wherein the computing system includes a plurality of processors that each have an architecture of the target computing system.

* * * * *